United States Patent
Shen et al.

(10) Patent No.: US 10,446,052 B2
(45) Date of Patent: Oct. 15, 2019

(54) LIP GLOSS GUIDE AND METHOD THEREOF

(71) Applicant: CAL-COMP BIG DATA, INC., New Taipei (TW)

(72) Inventors: Shyh-Yong Shen, New Taipei (TW); Min-Chang Chi, New Taipei (TW); Cheng-Hsuan Tsai, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 204 days.

(21) Appl. No.: 15/627,372

(22) Filed: Jun. 19, 2017

(65) Prior Publication Data
US 2018/0315337 A1 Nov. 1, 2018

(30) Foreign Application Priority Data
Apr. 27, 2017 (CN) .......................... 2017 1 0286388

(51) Int. Cl.
*G09B 19/00* (2006.01)
*A45D 44/00* (2006.01)
*G09B 5/02* (2006.01)
*G06K 9/00* (2006.01)

(52) U.S. Cl.
CPC .......... *G09B 19/00* (2013.01); *A45D 44/005* (2013.01); *G06K 9/00248* (2013.01); *G06K 9/00281* (2013.01); *G09B 5/02* (2013.01); *A45D 2044/007* (2013.01)

(58) Field of Classification Search
CPC ..... G09B 19/10; G09B 19/0076; A45D 44/00
See application file for complete search history.

(56) References Cited

U.S. PATENT DOCUMENTS

| | | | |
|---|---|---|---|
| 2012/0044335 A1* | 2/2012 | Goto | A45D 44/005 348/77 |
| 2015/0145882 A1* | 5/2015 | Nguyen | H04N 1/622 345/589 |
| 2016/0328632 A1 | 11/2016 | Choe et al. | |

OTHER PUBLICATIONS

Makoto J. Hirayama et al., "A Dialog Based Speech User Interface of a Makeup Support System for Visually Impaired Persons", Springer-Verlag Berlin Heidelberg 2013, Jul. 21, 2013, pp. 261-268.
"Search Report of Europe Counterpart Application", dated Mar. 7, 2018, p. 1-p. 9.

* cited by examiner

*Primary Examiner* — Omkar A Deodhar
(74) *Attorney, Agent, or Firm* — JCIPRNET

(57) ABSTRACT

A lip gloss guide device including an image capturing unit, a processing unit and a display unit is provide to guide a user to draw a lip gloss. The image capturing unit captures a face image of the user, where the face image includes a lip of the user. The processing unit receives the face image, and obtains a plurality of lip feature points according to the face image. The processing unit performs calculation according to the lip feature points and a predetermined ratio between an upper lip and a lower lip to obtain an upper lip gloss guide block and a lower lip gloss guide block. The display unit displays a lip image and the corresponding upper lip gloss guide block and lower lip gloss guide block, and guides the user to put on makeup to the upper lip gloss guide block and the lower lip gloss guide block.

10 Claims, 4 Drawing Sheets

LIP GLOSS GUIDE AND METHOD THEREOF

CROSS-REFERENCE TO RELATED APPLICATION

This application claims the priority benefit of China application serial no. 201710286388.X, filed on Apr. 27, 2017. The entirety of the above-mentioned patent application is hereby incorporated by reference herein and made a part of this specification.

BACKGROUND OF THE INVENTION

Field of the Invention

The disclosure relates to a facial feature recognition technique, and particularly relates to a lip gloss guide device based on lip shape recognition and a method thereof.

Description of Related Art

The love of beauty is woman's nature, and many women will add facial features through makeup. However, the skill of makeup is not innate, and a makeup effect can be improved after a number of cosmetic practises.

If someone wants to learn a makeup kill, the learner may learn it from images on the Internet. However, the makeup skill learned through images may have a deviation in practice. Therefore, how to learn the makeup skill through modern equipment is a technical issue concerned by manufacturers.

SUMMARY OF THE INVENTION

The disclosure is directed to a lip gloss guide device and a lip gloss guide method, where an upper lip gloss guide block is calculated and displayed according to a face image of a user, such that the user is able to put on makeup according to a prompt provided by the lip gloss guide device, so as to provide convenient interactive makeup teaching.

The disclosure provides a lip gloss guide device including an image capturing unit, a processing unit and a display unit. The image capturing unit captures a face image of a user, where the face image at least includes a lip of the user. The processing unit receives the face image, and acquires a plurality of lip feature points according to the face image. Moreover, the processing unit performs calculation according to the lip feature points and a predetermined ratio between an upper lip and a lower lip to obtain an upper lip gloss guide block and a lower lip gloss guide block. The display unit displays a lip image and the corresponding upper lip gloss guide block and lower lip gloss guide block, and guides the user to put on makeup to the upper lip gloss guide block and the lower lip gloss guide block.

The disclosure provides a lip gloss guide method, which includes following steps. A face image of a user is obtained, and a plurality of lip feature points is obtained according to the face image. Calculation is performed according to the lip feature points and a predetermined ratio between an upper lip and a lower lip to obtain an upper lip gloss guide block and a lower lip gloss guide block. The face image and the corresponding upper lip gloss guide block and the lower lip gloss guide block are displayed, and the user is guided to put on makeup to the upper lip gloss guide block and the lower lip gloss guide block.

According to the above description, the lip gloss guide device and the lip gloss guide method of the disclosure may calculate and display the upper lip gloss guide block and the lower lip gloss guide block according to the lip image of the user, such that the user learns an area to be put on a lip gloss, and the user clearly knows how to acquire different lip shapes through different lip gloss put-on positions. In this way, even the user is not familiar with makeup, the user may still put on the lip gloss according to the prompt provided by the lip gloss guide device, so as to provide convenient interactive makeup teaching.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
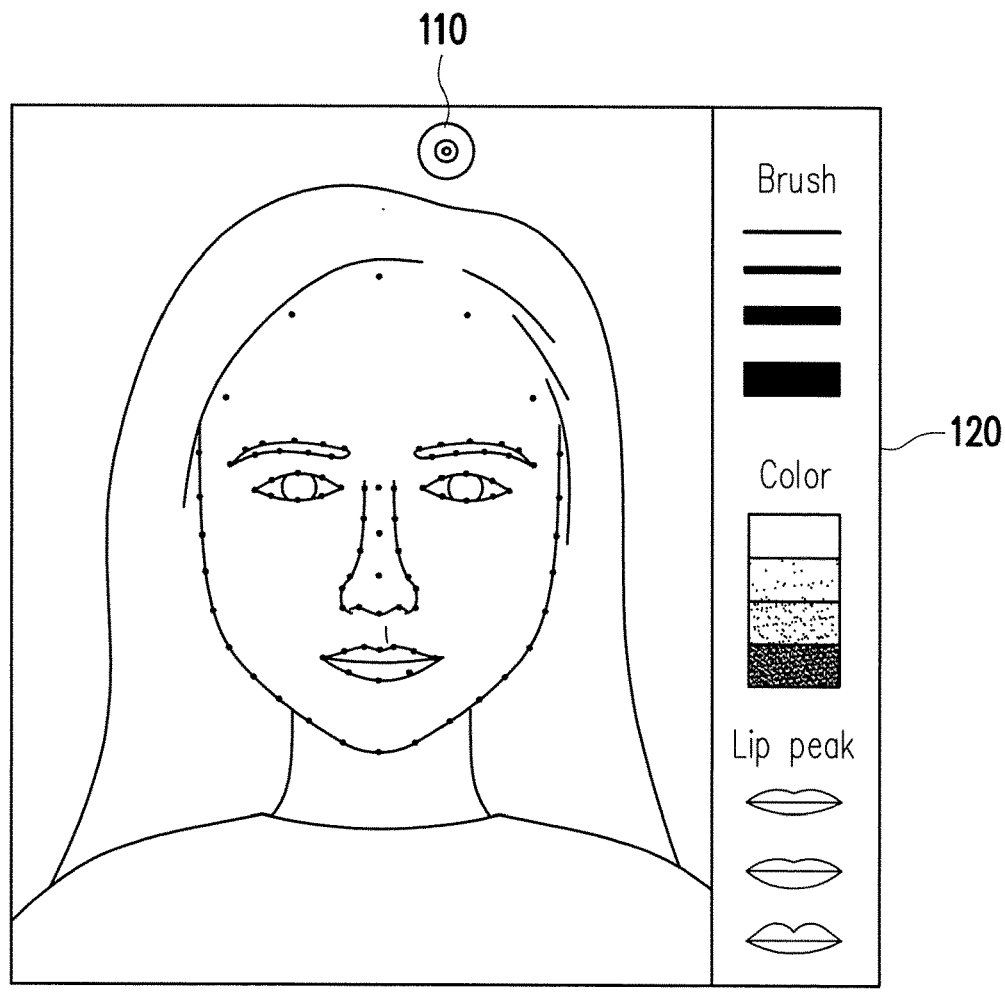
FIG. 1 is a schematic diagram of a display interface of a lip gloss guide device according to an embodiment of the disclosure.
Figure 2:
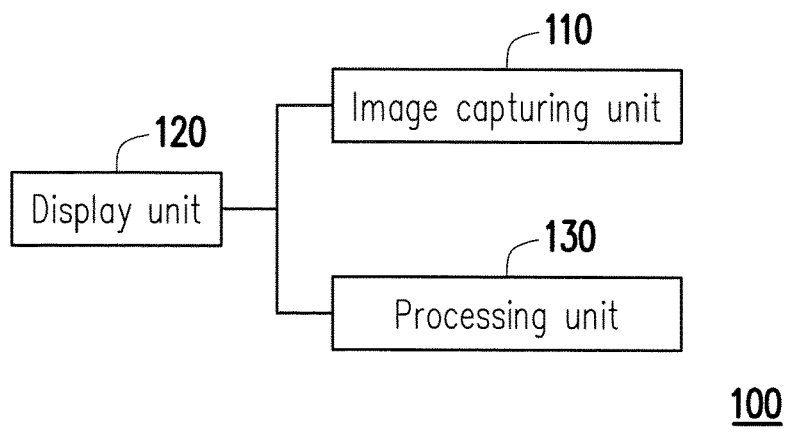
FIG. 2 is a system block diagram of a lip gloss guide device according to an embodiment of the disclosure.

FIG. 1 is a schematic diagram of a display interface of a lip gloss guide device according to an embodiment of the disclosure, and FIG. 2 is a system block diagram of a lip gloss guide device according to an embodiment of the disclosure. Referring to FIG. 1 and FIG. 2, in the present embodiment, the lip gloss guide device 100 includes an image capturing unit 110, a multimedia display unit 120 and a processing unit 130.

The image capturing unit 110 is used for capturing a face image of a user, where the face image includes a lip image. The image capturing unit 110 is, for example, an embedded video camera, an external mobile phone, an external camera, etc. connected to the display unit 120 and the processing unit 130 in a wired or wireless manner, which is not limited by the disclosure.

The display unit 120 may display multimedia information and the face image of the user in real-time. For example, the display unit 120 displays the face image of the user and provides options of a plurality of lip shapes and lip glosses for the user to select. In the present exemplary embodiment, the display unit 120 can be a display disposed behind a material with a high reflectivity (for example, a mirror) and combined with an organic light-emitting diode (OLED). In this way, the user may view her own face through the mirror, and the display unit 120 may display related information on the mirror for the user to view and for touch selection, though the disclosure is not limited thereto. The lip gloss guide device 100 of the present embodiment can be a device disposed on a makeup table, and a screen of the lip gloss guide device 100 can be disposed behind the mirror, and a text or an image displayed thereon may pass through the mirror for the user to view. In other embodiments, the lip gloss guide device 100 can also be a consumable electronic product such as a smart phone, a tablet PC, etc., or a portable mirror box combined with a portable mirror.

The processing unit 130 performs a calculation according to the face image of the user captured by the image capturing unit 110, so as to obtain a plurality of face feature points of the user related to the face of the user. For example, in an implementation of the present exemplary embodiment, the processing unit 130 can be a central processing unit (CPU), a microprocessor, an application specific integrated circuits (ASIC), a programmable logic device (PLD) or other similar devices. The processing unit 130 is configured to run various necessary software programs and/or instruction sets for providing lip gloss guide blocks. In the present embodiment, the processing unit 130 runs a face detection system using a Dlib face landmark to detect and analyze 194 face feature points of the user's face. In other cases, the face feature points of the user can be acquired by only analyzing 119 face feature points of the user's face or using other algorithms for detecting the face feature points.

In the present embodiment, when the user faces the mirror to put on a makeup, the display unit 120 may display the face image and the lip image of the user, and analyze the face feature points in real-time. In order to provide the convenient interactive lip gloss guide device, in the disclosure, the display unit 120 further displays the lip gloss guide blocks based on a lip position of the user to prompt a position and a manner to the user for drawing the lip gloss. In this way, the user may draw the lip gloss on the lip at the corresponding position on the user's face according to guidance of the lip gloss guide blocks displayed by the display unit 120. It should be noted that a method for displaying the lip gloss guide blocks is to display a frame line surrounding the lip. However, the method for displaying the lip gloss guide blocks is not limited thereto, and in other embodiments, the method for displaying the lip gloss guide blocks is to direct take the lip of the user as a reference to adjust a lip display block, and take the adjusted lip display block as the lip gloss guide block.

Figure 3:
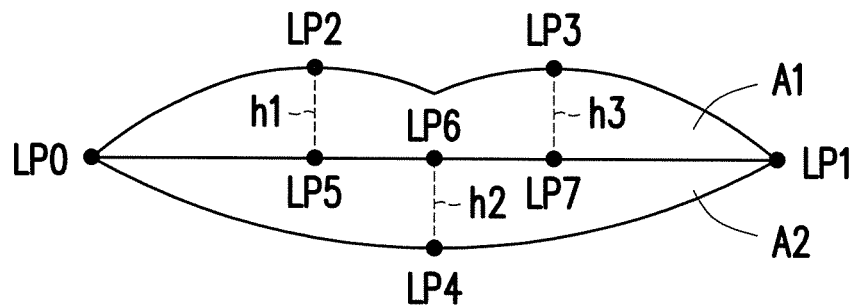
FIG. 3 is a schematic diagram of lip gloss guide blocks according to an embodiment of the disclosure.

Referring to FIG. 3, FIG. 3 is a schematic diagram of lip gloss guide blocks according to an embodiment of the disclosure. After the image capturing unit 110 captures the face image of the user, the processing unit 130 obtains a plurality of the lip feature points of the user according to the lip image of the user. The lip feature points of the user obtained by the processing unit 130 at least include two lip corners LP0, LP1, upper lip peaks LP2, LP3, a lower lip peak LP4 and lip feature points LP5, LP6, LP7 respectively perpendicular to the upper lip peaks LP2, LP3 and the lower lip peak LP4.

The lip feature points of the user obtained by the processing unit 130 is not limited thereto, and in other embodiments, the number of the face feature points obtained by the processing unit 130 can be 119, 194, etc., where the number of the lip feature points is, for example, 43. For example, in the implementation of 119 face feature points, the processing unit 130 may number each of the face feature points, for example, to number all of the face feature points by 0-118, where the lip feature points have numbers 58-100. Moreover, the lip corners LP0, LP1 respectively have a number 58 and a number 100, the upper lip peaks LP2, LP3 respectively have a number 63 and a number 66, the lower lip peak LP4 has a number 78, and the lip feature points LP5, LP6 and LP7 located at a boundary of upper and lower lips respectively have numbers 91, 94 and 95. However, the disclosure is not limited thereto.

After the lip feature points are obtained, the processing unit 130 may adjust the lip feature points according to positions of the lip feature points, a lip shape to be selected by the user and a predetermined ratio of upper and lower lip heights, so as to respectively obtain an upper lip gloss guide block A1 and a lower lip gloss guide block A2. How the processing unit 130 obtains the upper lip gloss guide block A1 and the lower lip gloss guide block A2 is described below.

First, the processing unit 130 calculates a vertical height h1 between the left upper lip peak LP2 and the lip feature points LP5, where the vertical height h1 is the upper lip height of the user. It should be noted that in other embodiments, the processing unit 130 may also calculate a vertical height h3 between the right upper lip peak LP3 and the lip feature points LP6, and take the vertical height h3 as the upper lip height of the user. Namely, the processing unit 130 may take the vertical height h1 corresponding to the left upper lip peak LP2 or the vertical height h3 corresponding to the right upper lip peak LP3 as the upper lip height of the user. Alternatively, in another embodiment, the processing unit 130 may respectively take the vertical heights h1 and h3 as heights of a left lip and a right lip, and respectively fine-tunes the left lip and the right lip. For simplicity's sake, in the following embodiments, the left upper lip peak LP2 and the corresponding vertical height h1 thereof are used as an example for description, i.e. the upper lip height is h1. However, regarding the right upper lip peak LP3 and the corresponding vertical height h3 thereof, or the left upper lip peak LP2 and the right upper lip peak LP3 and the corresponding vertical heights h1 and h3 thereof, the same method can be adopted to calculate and adjust the upper lip gloss guide block A1, which is not repeated.

Besides the upper lip height h1, the processing unit 130 may also calculate a lower lip height h2 of the user. To be specific, the processing unit 130 calculates a vertical distance h2 between the lower lip peak LP4 and the lip feature point LP6, and takes the vertical distance h2 as the lower lip height of the user. Moreover, after the upper lip height h1 and the lower lip height h2 of the user are obtained, the processing unit 130 may adjust a display position of the upper lip gloss guide block A1 and the lower lip gloss guide block A2 according to a predetermined ratio.

Taking the embodiment of FIG. 3 as an example, the lip shape selected by the user shows that the upper lip height h1 and the lower lip height h2 are the same, i.e. the predetermined ratio between the upper lip height h1 and the lower lip height h2 is 1:1. During the process of calculating and adjusting the lip feature points of the user to obtain the upper lip gloss guide block A1 and the lower lip gloss guide block A2, when the processing unit 130 determines that the ratio between the upper lip height h1 and the lower lip height h2 is not complied with the predetermined ratio, i.e. the ratio between the upper lip height h1 and the lower lip height h2 is not 1:1, the processing unit 130 may adjust the positions of the lip feature points of the user, such that the ratio between the upper and lower lip heights displayed by the display unit 120 is complied with the predetermined ratio.

To be specific, when the processing unit 130 determines that the ratio of the upper and lower lip heights is required to be adjusted, for example, when the upper lip height h1 is greater than the lower lip height h2, the processing unit 130 may take the lower lip height h2 as a reference to move down the upper lip peaks LP2, LP3 in a vertical manner, so as to equalize the upper lip height h1 and the lower lip height h2. Alternatively, when the upper lip height h1 is smaller than the lower lip height h2, the processing unit 130 may take the lower lip height h2 as a reference to move up the upper lip peaks LP2, LP3 in the vertical manner, so as to equalize the heights of the upper lip and the lower lip. It should be noted that when the processing unit 130 takes the lower lip height h2 as the reference to adjust the upper lip feature points, the processing unit 130 may simultaneously adjust the lip feature points located adjacent to the upper lip peaks LP2 and LP3. For example, the processing unit 130 may simultaneously move up or move down positions of the lip feature points located between the left upper lip peak LP2 and the left lip corner LP1 in a proportional manner. Alternatively, the processing unit 130 may further adjust horizontal and vertical positions of the lip feature points according to a proportion of a curve selected by the user, though the disclosure is not limited thereto.

In other embodiments, the processing unit 130 may also take the upper lip height h1 as a reference to adjust the lip feature points of the lower lip, so as to equalize the heights of the lower lip and the upper lip. For example, when the upper lip height h1 is greater than the lower lip height h2, the processing unit 130 may move down the lip feature points of the lower lip to increase the lower lip height h2, so as to equalize the heights of the lower lip and the upper lip.

Moreover, when the upper lip height and the lower lip height of the user are close to each other, the processing unit 130 does not adjust the heights of the upper lip and the lower lip. In the present embodiment, if a difference between the upper lip height h1 and the lower lip height h2 is within 5 pixels, the processing unit 130 determines that the heights of the upper lip height h1 and the lower lip height h2 are the same, though the disclosure is not limited thereto.

Figure 4:
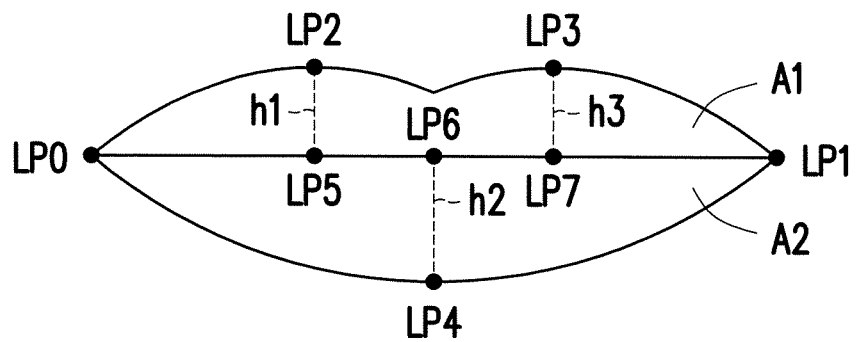
FIG. 4 is a schematic diagram of lip gloss guide blocks according to a second embodiment of the disclosure.

Referring to FIG. 4, FIG. 4 is a schematic diagram of lip gloss guide blocks according to a second embodiment of the disclosure. In the embodiment of FIG. 4, the method of obtaining the upper lip height h1 and the lower lip height h2 of the user is the same to that of the embodiment of FIG. 3, and detail thereof is not repeated. A difference there between is that in the embodiment of FIG. 4, the lip shape selected by the user is upper-thin lower-thick. According to a perfect proportion of makeup, in the upper-thin lower-thick lip shape, the predetermined ratio between the upper lip height h1 and the lower lip height h2 is 1:1.5, so that the predetermined ratio is the optimal upper and lower lip shape ratio in current medical cosmetology, though the disclosure is not limited thereto. In other embodiments, the user may suitably adjust the predetermine ratio of the upper and lower lip heights according to an actual requirement or different occasions. The ratio of the upper and lower lip shapes can be properly adjusted according to the makeup selected by the user.

Similar to FIG. 3, when the ratio of the upper lip height h1 and the lower lip height h2 of the user is not complied with the predetermined ratio, the processing unit 130 may take the lower lip height h2 as a reference to adjust the positions of the upper lip feature points in the upper lip gloss guide block A1, such that the ratio of the upper lip height h1 and the lower lip height h2 of the user can be complied with the predetermined ratio, i.e. the upper lip height h1:the lower lip height h2=1:1.5. However, in other embodiments, the processing unit 130 may also take the upper lip height h1 as a reference to adjust the lip feature points of the lower lip, such that the ratio of the upper lip height h1 and the lower lip height h2 can be complied with the predetermined ratio of 1:1.5, though the disclosure is not limited thereto.

Moreover, in other embodiment, the processing unit 130 may also take a smaller one of the upper lip height h1 and the lower lip height h2 as a reference to implement adjustment. For example, after the processing unit 130 obtains the upper lip height h1 and the lower lip height h2, the processing unit 130 simultaneously divides the upper lip height h1 and the lower lip height h2 by the upper lip height h1, i.e. the calculated upper lip height is changed to 1. Now, if the calculated lower lip height h2 is smaller than 1.5, the lower lip height h2 is taken as a reference to adjust the lip feature points of the upper lip. Conversely, if the calculated lower lip height h2 is greater than 1.5, it represents that the upper lip height is smaller compared to the predetermined ratio, so that the upper lip height h1 is taken as a reference to adjust the lip feature points of the lower lip. Based on the upper lip gloss guide block A1 provided by the lip gloss guide device, the lip gloss of the user does not exceed an actual lip range of the user, such that the lip shape of the user is maintained to a smaller shape in a visual effect.

Figure 5:
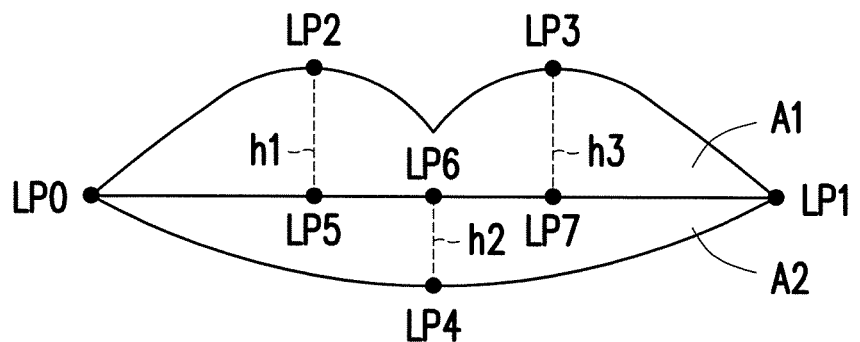
FIG. 5 is a schematic diagram of lip gloss guide blocks according to a third embodiment of the disclosure.

Referring to FIG. 5, FIG. 5 is a schematic diagram of lip gloss guide blocks according to a third embodiment of the disclosure. In the embodiment of FIG. 5, the method of obtaining the upper lip height h1 and the lower lip height h2 of the user is the same to that of the embodiment of FIG. 3, and detail thereof is not repeated. A difference there between is that in the embodiment of FIG. 5, the lip shape selected by the user is upper-thick lower-thin. According to a perfect proportion of makeup, in the upper-thick lower-thin lip shape, the predetermined ratio of the upper and lower lip heights is 1.5:1, though the disclosure is not limited thereto. In other embodiments, the user may suitably adjust the predetermine ratio of the upper and lower lip heights according to an actual requirement.

Similar to FIG. 3, when the ratio of the upper lip height h1 and the lower lip height h2 of the user is not complied with the predetermined ratio, the processing unit 130 may take the lower lip height h2 as a reference to adjust the positions of the upper lip feature points in the upper lip gloss guide block A1, such that the ratio of the upper lip height h1 and the lower lip height h2 of the user can be complied with the predetermined ratio, i.e. the upper lip height h1:the lower lip height h2=1:1.5. However, in other embodiments, the processing unit 130 may also take the upper lip height h1 as a reference to adjust the lip feature points of the lower lip, such that the ratio of the upper lip height h1 and the lower lip height h2 is 1:1.5. Moreover, in an embodiment, the processing unit 130 may also dynamically adjust the reference, which is not limited by the disclosure. The detailed adjusting method has been disclosed in the embodiments of FIG. 3 and FIG. 4, and detail thereof is not repeated.

Figure 6:
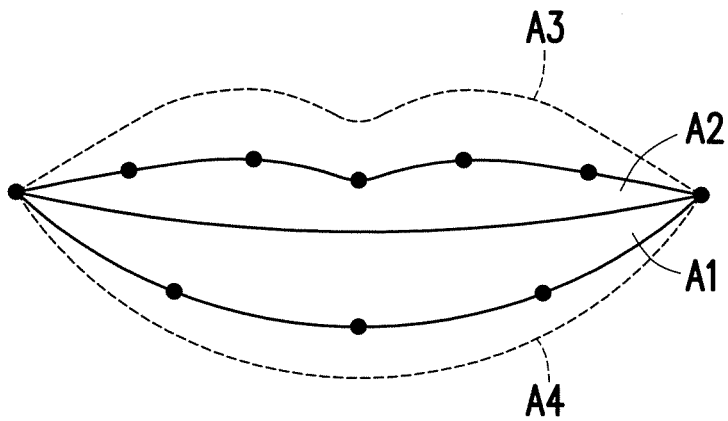
FIG. 6 is a schematic diagram of a second lip gloss guide block according to an embodiment of the disclosure.

Referring to FIG. 6, FIG. 6 is a schematic diagram of lip gloss guide blocks according to an embodiment of the disclosure. In an embodiment of the disclosure, when the processing unit 130 determines that the upper lip gloss guide block A1 or the lower lip gloss guide block A2 is smaller than the real lip of the user, the processing unit 130 further instructs the display unit 120 to display a third upper lip gloss guide block A3 and a fourth lower lip gloss guide block A4 located between a user lip block and the upper lip gloss guide block A1. In this way, the user may draw a decorative lip gloss or concealer on the lip at a position corresponding to the third upper lip gloss guide block A3 and the fourth lower lip gloss guide block A4, such that the user may accurately draw the desired lip shape.

Moreover, when the processing unit 130 determines that the upper lip gloss guide block A1 is greater than the actual user lip block, the user may draw a profile of the lip gloss on the lip at a position corresponding to a periphery of the upper lip gloss guide block A1 and the lower lip gloss guide block A2, and coats a favourite lip gloss in the upper lip gloss guide block A1.

Figure 7:
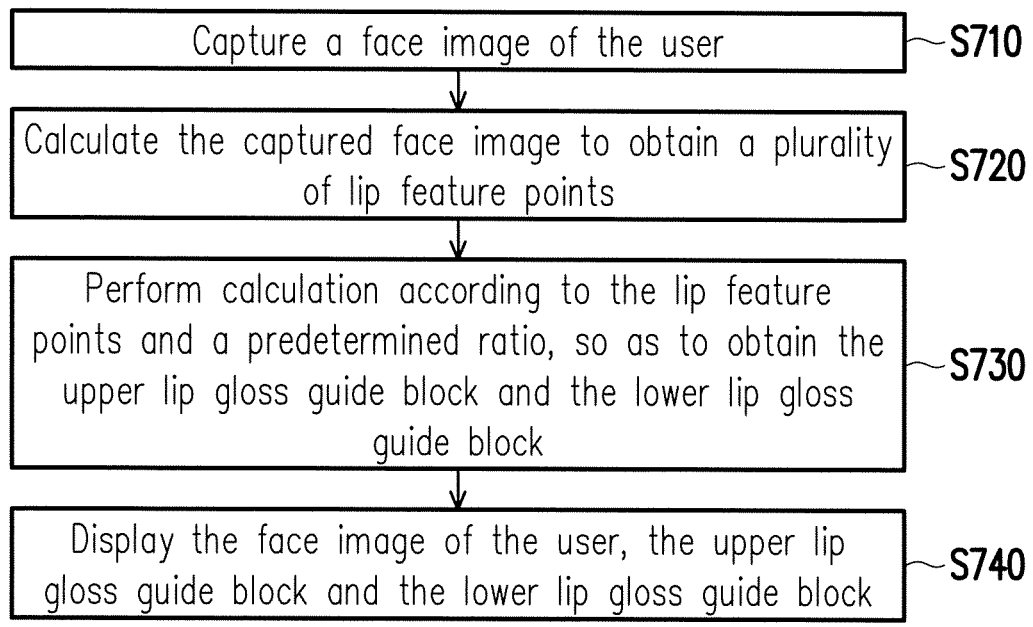
FIG. 7 is a flowchart illustrating a lip gloss guide method according to an embodiment of the disclosure.

FIG. 7 is a flowchart illustrating a lip gloss guide method according to an exemplary embodiment of the disclosure. Referring to FIG. 2, FIG. 3 and FIG. 7, when the user wants to use the lip gloss guide device 100 to provide a guidance for drawing the lip gloss, first, in step S710, the image capturing unit 110 captures a face image of the user, where the face image includes a lip image of the user. The image capturing unit 110 transmits the captured face image of the user to the processing unit 130. Then, in step S720, the processing unit 130 calculates the captured face image to obtain a plurality of lip feature points FP0-FP7 of the user. Moreover, in step S730, the processing unit 130 performs calculation and adjusts the lip feature points FP0-FP7 of the user according to the lip feature points and a predetermined ratio, so as to obtain the upper lip gloss guide block A1 and the lower lip gloss guide block A2 corresponding to the user's face. Finally, the processing unit 130 may transmit the face image of the user obtained by the image capturing unit 110 and the upper lip gloss guide block A1 and the lower lip gloss guide block A2 calculated by the processing unit 130 to the display unit 120. In step S740, the processing unit 130 instructs the display unit 120 to display the face image of the user, the upper lip gloss guide block A1 and the lower lip gloss guide block A2.

It should be noted that in the present exemplary embodiment, since the lip gloss guide method is to obtain the face image and calculate the upper lip gloss guide block A1 in a real-time manner, the step S710 to the step S740 are repeatedly executed until the user stops the operation.

Moreover, the lip gloss guide method of the present exemplary embodiment may adjust a pattern of the lip gloss guide block according to user's selection, for example, upper-thin lower-thick or upper-thick lower thin. Alternatively, the user may also select a color, a texture of the lip gloss in the display unit 120, and previews the same in the display unit 120. In other exemplary embodiments, the processing unit 130 may finely adjust the upper lip gloss guide block A1 and the lower lip gloss guide block A2 according to the color and the texture selected by the user, and display the same in the display unit 120.

Figure 8:
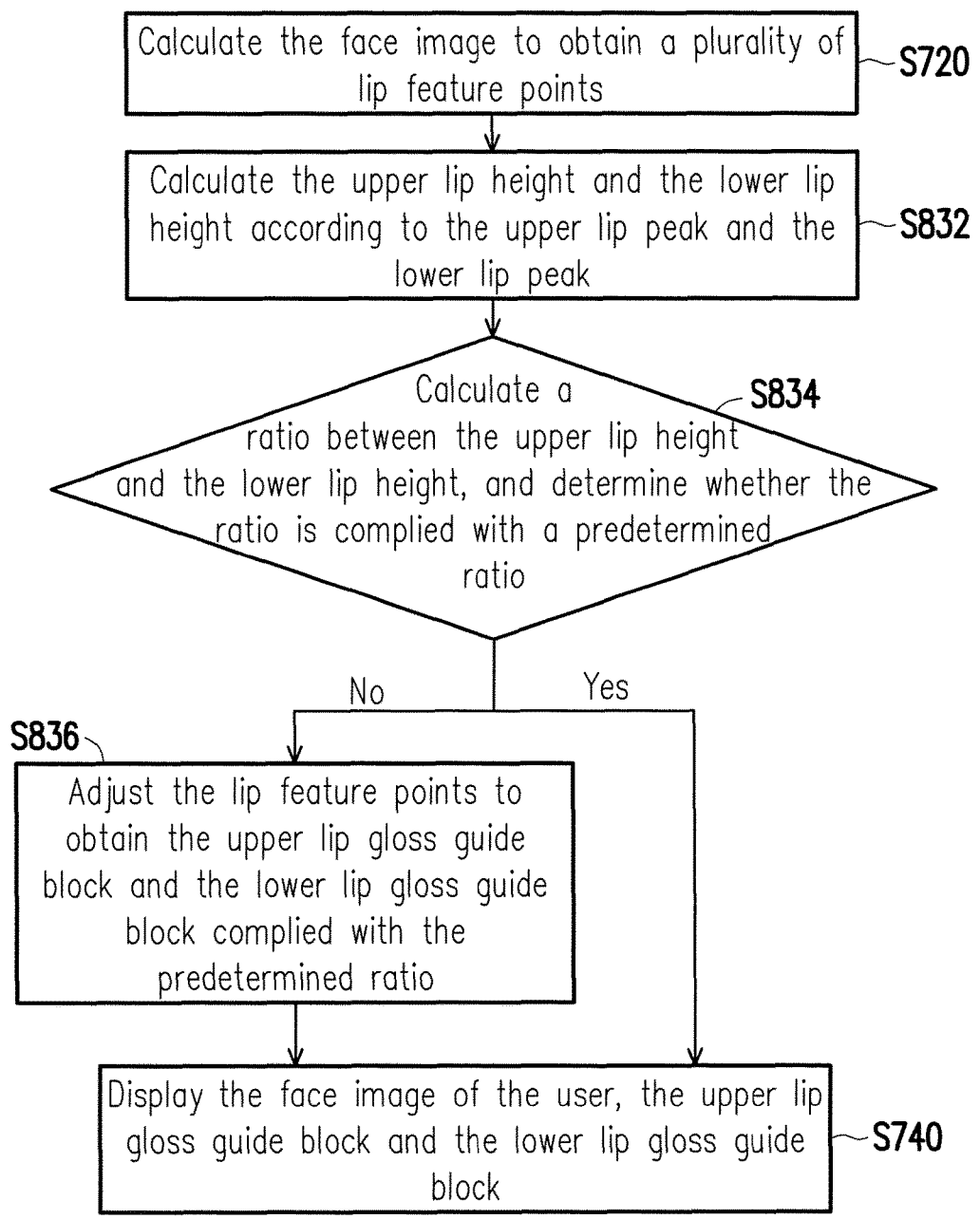
FIG. 8 is a detailed flow of obtaining a lip gloss guide block according to an embodiment of the disclosure.

FIG. 8 is a detailed flow of obtaining the lip gloss guide block. Referring to FIG. 3 and FIG. 8, in the present embodiment, when the step S730 is executed, i.e. when the processing unit 130 performs calculation according to the lip feature points and the predetermined ratio to obtain the upper lip gloss guide block A1, in step S832, the processing unit 130 calculates the upper lip height h1 and the lower lip height h2 according to the upper lip peak and the lower lip peak. The processing unit 130 may first calculate the upper lip height h1 of the user, or first calculate the lower lip height h2 of the user, and a calculation sequence of the processing unit 130 is not limited by the disclosure. The detailed calculation method of the upper lip height h1 and the lower lip height h2 has been described in the embodiment of FIG. 3, which is not repeated.

Then, in step S834, the processing unit 130 further calculates a ratio between the upper lip height h1 and the lower lip height h2, and determines whether the ratio is complied with a predetermined ratio. Moreover, when the ratio between the upper lip height h1 and the lower lip height h2 is not complied with the predetermined ratio, in step S836, the processing unit 130 further adjusts the lip feature points to obtain the upper lip gloss guide block A1 and the lower lip gloss guide block A2 complied with the predetermined ratio. The detailed adjusting method has been disclosed in the embodiments of FIG. 3 to FIG. 5, and detail thereof is not repeated.

After the step S836 is executed, since the processing unit 130 has calculated the upper lip gloss guide block A1 and the lower lip gloss guide block A2, the processing unit 130 may transmit the face image of the user obtained by the image capturing unit 110 and the upper lip gloss guide block A1 and the lower lip gloss guide block A2 calculated by the processing unit 130 to the display unit 120, and in the step S740, the processing unit 130 instructs the display unit 120 to display the face image of the user, the upper lip gloss guide block A1 and the lower lip gloss guide block A2.

Moreover, in the step S834, when the processing unit 130 determines that the ratio between the upper lip height h1 and the lower lip height h2 of the user is complied with the predetermined ratio, the step S740 is directly executed, by which the processing unit 130 instructs the display unit 120 to display the face image of the user, the upper lip gloss guide block A1 and the lower lip gloss guide block A2.

Through the flows of FIG. 7 and FIG. 8, the processing unit 130 may calculate the upper lip gloss guide block A1 and the lower lip gloss guide block A2. Therefore, the user may view the calculated upper lip gloss guide block A1 and the lower lip gloss guide block A2 through the display unit 120, and draw the lip gloss on the face at positions corresponding to the upper lip gloss guide block A1 and the lower lip gloss guide block A2.

In summary, the lip gloss guide device and the lip gloss guide method of the disclosure may calculate and display the lip gloss guide blocks according to the face image of the user, such that the user clearly knows a position suitable for putting on the lip gloss during a makeup process, and correspondingly draws the lip gloss. In this way, even the user is not familiar with makeup, the user may still put on the lip gloss according to the prompt provided by the lip gloss guide device, so as to provide convenient interactive makeup teaching.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A lip gloss guide device, comprising:
   a camera, capturing a face image of a user, wherein the face image at least comprises a lip of the user;
   a processor, receiving the face image, obtaining a plurality of lip feature points according to the face image, wherein in response to that a lip shape is selected, the processor performs calculation according to the lip feature points and a predetermined ratio between an upper lip and a lower lip to obtain an upper lip gloss guide block and a lower lip gloss guide block, wherein the predetermine ratio is corresponding to the selected lip shape; and
   a display, displaying the face image and a frame line of the corresponding upper lip gloss guide block and lower lip gloss guide block, and so as to guide the user to put on makeup according to the upper lip gloss guide block and the lower lip gloss guide block.

2. The lip gloss guide device as claimed in claim 1, wherein the lip feature points at least comprise a left lip corner, a right lip corner, a left upper lip peak, a right upper lip peak, a lower lip peak and a first feature point corresponding to the left upper lip peak and a second feature point corresponding to the lower lip peak, wherein the first feature point and the second feature point are located at a boundary of the upper lip and the lower lip, the processor calculates a first vertical height according to the left upper lip peak and the first feature point, and calculates a second vertical height according to the lower lip peak and the second feature point, the processor determines whether the first vertical height and the second vertical height comply with the predetermined ratio, when the first vertical height and the second vertical height do not comply with the predetermined ratio, the processor adjusts the lip feature points according to the first vertical height and the second vertical height to obtain the upper lip gloss guide block and the lower lip gloss guide block.

3. The lip gloss guide device as claimed in claim 2, wherein when the first vertical height and the second vertical height do not comply with the predetermined ratio, the processor adjusts the lip feature points corresponding to the second vertical height in the plurality of lip feature points according to the first vertical height, or adjusts the lip feature points corresponding to the first vertical height in the plurality of lip feature points according to the second vertical height.

4. The lip gloss guide device as claimed in claim 1, wherein the predetermined ratio is one of ratios of the first vertical height and the second vertical height of 1:1.5, 1.5:1 or 1:1.

5. The lip gloss guide device as claimed in claim 1, wherein the lip feature points at least comprise a left lip corner, a right lip corner, a left upper lip peak, a right upper lip peak, a lower lip peak and a third feature point corresponding to the right upper lip peak and a second feature point corresponding to the lower lip peak, wherein the third feature point and the second feature point are located at a boundary of the upper lip and the lower lip, the processor calculates a third vertical height according to the right upper lip peak and the third feature point, and calculates a second vertical height according to the lower lip peak and the second feature point, the processor determines whether the third vertical height and the second vertical height comply with the predetermined ratio, when the third vertical height and the second vertical height do not comply with the predetermined ratio, the processor adjusts the lip feature points according to the third vertical height and the second vertical height to obtain the upper lip gloss guide block and the lower lip gloss guide block.

6. A lip gloss guide method, comprising:
obtaining a face image of a user;
receiving the face image;
obtaining a plurality of lip feature points according to the face image;
in response to that a lip shape is selected, performing calculation according to the lip feature points and a predetermined ratio between an upper lip and a lower lip to obtain an upper lip gloss guide block and a lower lip gloss guide block, wherein the predetermine ratio is corresponding to the selected lip shape; and displaying the face image and a frame line of the corresponding upper lip gloss guide block and the lower lip gloss guide block so as to guide the user to put on makeup to the upper lip gloss guide block and the lower lip gloss guide block.

7. The lip gloss guide method as claimed in claim 6, wherein the lip feature points at least comprise a left lip corner, a right lip corner, a left upper lip peak, a right upper lip peak, a lower lip peak and a first feature point corresponding to the left upper lip peak and a second feature point corresponding to the lower lip peak, wherein the first feature point and the second feature point are located at a boundary of the upper lip and the lower lip, and the lip gloss guide method further comprises:

calculating a first vertical height according to the left upper lip peak and the first feature point, and calculating a second vertical height according to the lower lip peak and the second feature point;

determining whether the first vertical height and the second vertical height comply the predetermined ratio; and adjusting the lip feature points according to the first vertical height and the second vertical height when the first vertical height and the second vertical height do not comply with the predetermined ratio, so as to obtain the upper lip gloss guide block and the lower lip gloss guide block.

8. The lip gloss guide method as claimed in claim 7, wherein when the first vertical height and the second vertical height do not comply with the predetermined ratio, the lip feature points corresponding to the second vertical height in the plurality of lip feature points are adjusted according to the first vertical height, or the lip feature points corresponding to the first vertical height in the plurality of lip feature points are adjusted according to the second vertical height.

9. The lip gloss guide method as claimed in claim 6, wherein the predetermined ratio is one of ratios of the first vertical height and the second vertical height of 1:1.5, 1.5:1 or 1:1.

10. The lip gloss guide method as claimed in claim 6, wherein the lip feature points at least comprise a left lip corner, a right lip corner, a left upper lip peak, a right upper lip peak, a lower lip peak and a third feature point corresponding to the right upper lip peak and a second feature point corresponding to the lower lip peak, wherein the third feature point and the second feature point are located at a boundary of the upper lip and the lower lip, and the lip gloss guide method further comprises:

calculating a third vertical height according to the right upper lip peak and the third feature point, and calculating a second vertical height according to the lower lip peak and the second feature point;

determining whether the third vertical height and the second vertical height comply with the predetermined ratio;

adjusting the lip feature points according to the third vertical height and the second vertical height when the third vertical height and the second vertical height do not comply with the predetermined ratio, so as to obtain the upper lip gloss guide block and the lower lip gloss guide block.

* * * * *